United States Patent Office 2,868,839
Patented Jan. 13, 1959

2,868,839

1-OXO-1-PHENYL-HEXA-2,4-DIYNE AND ITS INTERMEDIATE AND PROCESS FOR THE PRODUCTION OF SAID COMPOUNDS

Kaneo Imai, Ichikawa-Shi, Nobukazu Ikeda, Bunkyo-Ku, Kiichiro Tanaka, Asagaya, Suginami-Ku, and Shinichi Sugawara, Nakano-Ku, Tokyo-To, Japan, assignors to Sankyo Company Ltd., Tokyo-To, Japan No Drawing. Application November 20, 1956
Serial No. 623,294

Claims priority, application Japan December 1, 1955

4 Claims. (Cl. 260—592)

This invention relates to 1-oxo-1-phenyl-hexa-2,4-diyne and to a process for its production.

An essential object of this invention is to provide a new compound which is very useful not only as therapeutic agent for dermatophytosis, but also as agricultural chemicals effective against certain phytopathogens.

Another object of this invention is to provide a new process for the production of the said compound.

A further object of this invention is to provide a new compound which is very useful as intermediate in the preparation of the new compound of this invention.

Still further object of this invention is to provide a new process for the production of the said intermediate.

The new compound of this invention, 1-oxo-1-phenyl-hexa-2,4-diyne, may be represented by the formula

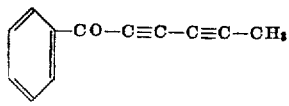

The new compound has been found to be very effective against various microbes and more particularly against dermatophytes.

According to this invention, 1-oxo-1-phenyl-hexa-2,4-diyne is produced by oxidizing 1-hydroxy-1-phenyl-hexa-2,4-diyne.

Any one of various oxidizing methods may be used for said oxidation, but it is preferable to use a conventional oxidizing agent such as chromic anhydride.

This oxidation reaction is represented by the following equation

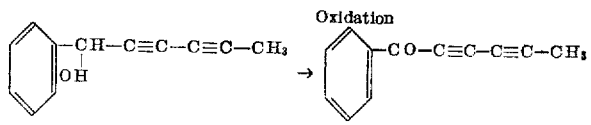

According to this invention, 1-hydroxy-1-phenyl-hexa-2,4-diyne which is very useful as the intermediate for the production of 1-oxo-1-phenyl-hexa-2,4-diyne can be obtained by reacting penta-1,3-diyne having the formula

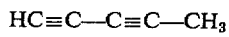

with sodium in a solvent such as, for example, liquid ammonia and then by reacting the thus produced product with benzaldehyde.

1-oxo-1-phenyl-hexa-2,4-diyne has remarkable biological activity.

The said activity may be proved by the following data.

TABLE I

Antimicrobial spectrum of 1-oxo-1-phenyl-hexa-2,4-diyne

| Test organism: | Minimum inhibitory concentration ($\gamma$/cc.) |
|---|---|
| B. subtilis PCI 219 | 100 |
| B. agri | 100 |
| Staph. aureus 209 P | 200 |
| E. coli | 200 |
| B. aroideae | >200 |
| Bact. solanacearum | >200 |
| Bact. tumefaciens | 100 |
| Sacch. cerevisiae | 2.5 |
| Sacch. pastorianus | 2.5 |
| Torula utilis | 5 |
| Zygosacch. salsus | 5 |
| Candida albicans | 10 |
| Aspergillus awamori | 2.5 |
| A. niger | 10 |
| A. oryzae | 5 |
| Pen. chrysogenum Q 176 | 10 |
| Rhizopus javanicus | 20 |
| Alternaria kikuchiana | 10 |
| Corticium vagum | 100 |
| Gibberella fujikuroi | 10 |
| Gib. saubinetii | 2 |
| Gloeosporium kaki | 5 |
| Gloeosp. aleticolor | 5 |
| Glomerella lagenarium | 10 |
| Helicobasidium mompa | 5 |
| Hypochnus centrifugus | 100 |
| Macrosporium bataticola | 20 |
| Ophiobolus miyabeanus | 2 |
| Pestalozzia diospyri | 2 |
| Piricularia oryzae | 2 |
| Epidermophyton inguinale | 0.063 |
| Microsporum gypseum | 0.5 |
| M. japonicum | 0.063 |
| Trichophyton asteroides | 0.5 |
| T. interdigitale | 0.25 |
| T. purpureum | 0.25 |

EXAMPLE I.—PRODUCTION OF 1-OXO-1-PHENYL-HEXA-2,4-DIYNE 40 g. of 1-hydroxy-1-phenyl-hexa-2,4-diyne was dissolved in 80 cc. of acetone to produce a first solution.

Separately, 11 g. of concentrated sulphuric acid and 14 g. of chromic anhydride were dissolved in 40 cc. of water to produce the second solution. The first solution was gradually added dropwise into the second solution at a temperature below 20° C. while stirring the said mixture and then the reaction was continued for 1 hour.

After the reaction was completed, the contents were diluted with water and then extracted with ether.

The extract was distilled to remove ether and the resulting residual was recrystallized from n-hexane, whereby 32 g. of colourless and rhombic plate-shaped crystal of which melting point is 81° C. was obtained.

Elementary analysis of this product showed the following data:

C—86.05%, H—5.04%.
C—85.71%, H—4.89%.

The theoretical value calculated for $C_{12}H_8O$:

C—85.69%, H—4.79%.

Molecular weight:

Found value (Rast method) _____ 164.5
Calculated value _____ 168.06

The reaction of this example is as follows:

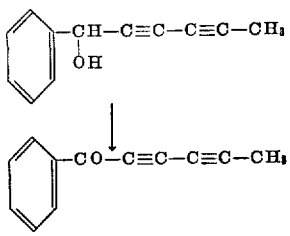

EXAMPLE II.—PRODUCTION OF 1-HYDROXY-1-PHENYL-HEXA-2,4-DIYNE

Sodium amide was prepared by gradual addition of 7 g. of metallic sodium into 300 cc. of liquid ammonia while stirring the mixture to prepare the first solution. Separately, the second solution was prepared by dissolving 20 g. of penta-1,3-diyne into 20 cc. of ether.

The second solution was gradually added dropwise into the first solution during a period of one hour while cooling the reaction mixture with Dry Ice acetone and while stirring the reaction mixture. This stirring was continued for one additional hour after the addition of the second solution into the first solution was completed. Then, a third solution prepared by dissolving 32 g. of benzaldehyde in 30 cc. of ether and the third solution was gradually added dropwise into the resulting solution formed by the reaction of the first two over a period of about one hour.

This mixture was stirred for 12 hours to make the reaction complete. After completion of the reaction, the excess sodium amide was decomposed by addition of 20 g. of ammonium chloride and then the final reaction product was extracted with ether.

The extract was dried and the ether was distilled and then the residue was recrystallized with diluted alcohol, whereby 37 g. of colourless pillar-shaped crystal of which melting point is 86° C. was obtained.

*Analysis.*—Found: C—84.61%; H—5.72%. Calculated for $C_{12}H_{10}O$: C—84.67%; H—5.92%.

Molecular weights:

Found value (Rast method) _____ 170
Calculated value _____ 170.20

The reaction of this example is as follows:

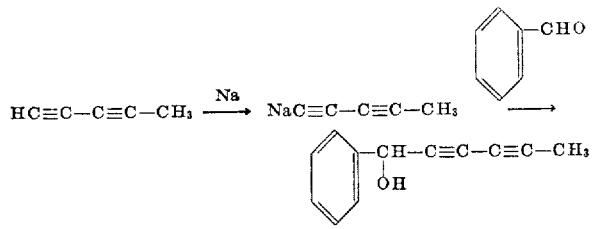

While we have described particular embodiments of our invention, it will, of course, be understood that we do not wish to be limited thereto, since many modifications may be made and we, therefore, contemplate by the appended claims to cover all such modifications as fall within the true spirit and scope of our invention.

We claim as our invention:

1. 1-oxo-1-phenyl-hexa-2,4-diyne having the formula

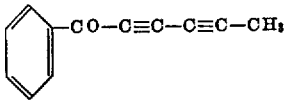

2. The process for the production of 1-oxo-1-phenyl-hexa-2,4-diyne having the formula

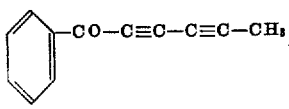

which comprises oxidizing 1-hydroxy-1-phenyl-hexa-2,4-diyne having the formula

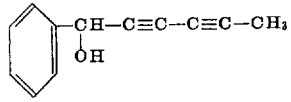

with chromic anhydride and concentrated sulphuric acid at a temperature below 20° C. while stirring.

3. 1-hydroxy-1-phenyl-hexa-2,4-diyne having the formula

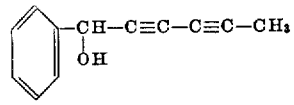

4. The process for the production of 1-hydroxy-1-phenyl-hexa-2,4-diyne having the formula

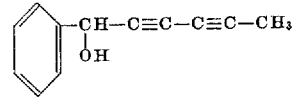

which comprises reacting penta-1,3-diyne having the formula $$HC\equiv C-C\equiv C-CH_3$$

with sodium in liquid ammonia while cooling the reaction mixture and slowly adding benzaldehyde to the resulting reaction mixture, treating the resulting reaction mixture with ammonium chloride, and extracting the product with ether.

References Cited in the file of this patent
UNITED STATES PATENTS 1,963,934    Carothers et al. _____ June 19, 1934

OTHER REFERENCES

Campbell et al.: J. Am. Chem. Soc., vol. 60, pp. 2882–4 (1938).

Neidig et al.: J. Am. Chem Soc., vol. 72, pp. 4617–8 (1950).